United States Patent
Dagley et al.

(10) Patent No.: US 10,861,190 B2
(45) Date of Patent: *Dec. 8, 2020

(54) SYSTEM AND METHOD FOR RECALIBRATING AN AUGMENTED REALITY EXPERIENCE USING PHYSICAL MARKERS

(71) Applicant: Capital One Services, LLC, McLean, VA (US)

(72) Inventors: Geoffrey Dagley, McKinney, TX (US); Stephen Wylie, Carrollton, TX (US); Jason Hoover, Grapevine, TX (US); Micah Price, Plano, TX (US); Qiaochu Tang, The Colony, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/557,697

(22) Filed: Aug. 30, 2019

(65) Prior Publication Data

US 2020/0167958 A1 May 28, 2020

Related U.S. Application Data

(63) Continuation of application No. 16/200,305, filed on Nov. 26, 2018.

(51) Int. Cl.
| | |
|---|---|
| G06T 19/00 | (2011.01) |
| H04N 5/232 | (2006.01) |
| G06T 7/80 | (2017.01) |
| G06T 7/73 | (2017.01) |

(52) U.S. Cl.
CPC .......... *G06T 7/80* (2017.01); *G06T 7/73* (2017.01); *G06T 19/006* (2013.01); *H04N 5/23299* (2018.08); *G06T 2207/30204* (2013.01)

(58) Field of Classification Search
None
See application file for complete search history.

(56) References Cited

U.S. PATENT DOCUMENTS

| | | | |
|---|---|---|---|
| 6,757,068 B2 | 6/2004 | Foxlin | |
| 2011/0221771 A1 | 9/2011 | Cramer et al. | |
| 2013/0141461 A1* | 6/2013 | Salter | G06K 9/00671 |
| | | | 345/633 |
| 2015/0219767 A1 | 8/2015 | Humphreys et al. | |
| 2016/0143693 A1 | 5/2016 | Yilmaz et al. | |
| 2016/0148433 A1 | 5/2016 | Petrovskaya et al. | |
| 2016/0239080 A1 | 8/2016 | Marcolina et al. | |
| 2016/0327653 A1 | 11/2016 | Humphreys et al. | |
| 2017/0163882 A1 | 6/2017 | Piramuthu et al. | |
| 2017/0243403 A1 | 8/2017 | Daniels et al. | |
| 2017/0256097 A1 | 9/2017 | Finn et al. | |
| 2017/0316297 A1 | 11/2017 | Lee | |
| 2017/0331924 A1 | 11/2017 | Katori | |
| 2018/0005450 A1 | 1/2018 | Daniels et al. | |
| 2018/0033202 A1 | 2/2018 | Lam et al. | |

* cited by examiner

*Primary Examiner* — Mark T Monk
(74) *Attorney, Agent, or Firm* — Hunton Andrews Kurth LLP

(57) ABSTRACT

Embodiments disclosed herein provide for a system and method for recalibrating an augmented reality experience in mobile devices using a plurality of physical markers. The system and methods provide for realigning the digital representation to the physical world using known physical locations associated with the physical markers that map directly to the digital representation.

20 Claims, 6 Drawing Sheets

SYSTEM AND METHOD FOR RECALIBRATING AN AUGMENTED REALITY EXPERIENCE USING PHYSICAL MARKERS

CROSS REFERENCE TO RELATED APPLICATION:

The subject application is a continuation of U.S. patent application No. 16/200,305 filed Nov. 26, 2018, the contents of which are hereby incorporated by reference in their entirety.

TECHNICAL FIELD

The present application relates to a system and method for recalibrating an augmented reality experience using physical markers.

BACKGROUND

Augmented reality refers to the augmentation of a live view of the physical world with computer-generated digital information and images in real time. Therefore, unlike virtual reality, which utilizes a totally digital environment, augmented reality generates a composite view including the existing environment as well as other artificial elements. Augmented reality can work with any device including a camera and display. Specifically, environments captured through the camera can be displayed with three-dimensional (3D) virtual text, objects, and characters overlaid on to them. Augmented realities can be developed with a specific augmented reality development platform. Apple Inc. and Google LLC developed such platforms for their mobile devices, ARKit and ARCore, respectively. Other augmented reality development platforms may also be utilized, e.g., Wikitude, DeepAR, EasyAR, ARToolKit, Kudan, Maxst, Vuforia, NyARToolkit. The augmented reality development platforms allow applications running on the mobile device to track the digital world to the physical world using a combination of a camera and motion sensors (e.g., accelerometer and gyroscope). However, over time, the digital world representation can start to drift from the physical world. Further, this drift can be amplified over larger distances as the user of the mobile device moves around in a bigger space, e.g., car lot, mall, etc. Further, although mobile devices utilize the global positioning system (GPS) to determine the location of the particular mobile device, GPS hasn't been as effective for tracking much smaller changes in distances. For example, GPS isn't as useful when the change in distance is a few feet or inches. Further, other tracking technologies, such as radio frequency identification (RFID) and Bluetooth Low Energy (BLE), fail to accurately track such small changes as well.

Accordingly, there is a need to occasionally reset the digital representation to realign to the physical world using known physical locations that can map directly to the digital representation.

DESCRIPTION OF EMBODIMENTS

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

One aspect of the present disclosure is to provide a system and method for recalibrating an augmented reality experience using physical markers. The systems and methods herein address at least one of the problems discussed above.

According to an embodiment, a system for recalibrating an augmented reality (AR) experience using a plurality of physical markers includes: a memory, wherein the memory is configured to store a digital location of each of the plurality of physical markers associated with the AR experience, wherein (i) the digital location of one of the plurality of physical markers is stored as an origin and (ii) the digital locations of a remaining of the plurality of physical markers are determined in relation to the origin; a camera, wherein the camera is configured to capture an image of at least one of the plurality of physical markers; a processing device, wherein the processing device is configured to: determine a digital location of the camera based on the captured image of the at least one of the plurality of physical markers; and recalibrate the AR experience based on the determined digital location, wherein the recalibrating includes aligning the AR experience to the determined digital location.

According to an embodiment, a method for recalibrating an augmented reality (AR) experience using a plurality of physical markers includes: capturing, with a camera, an image of at least one of the plurality of physical markers; determining, with a processing device, a digital location of the camera based on the captured image of the at least one of the plurality of physical markers; and recalibrating, with the processing device, the AR experience based on the determined digital location, wherein the recalibrating includes aligning the AR experience to the determined digital location.

According to an embodiment, a system for recalibrating an augmented reality (AR) experience using a plurality of physical markers includes a mobile device; and a server; wherein the mobile device includes: a camera, wherein the camera is configured to capture an image of at least one of the plurality of physical markers; and a processing device, wherein the processing device is configured to: determine a digital location of the camera based on the captured image of the at least one of the plurality of physical markers; recalibrate the AR experience based on the determined digital location, wherein the recalibrating includes aligning the AR experience to the determined digital location; and transmit the determined digital location to the server; wherein the server includes: a memory, wherein the memory is configured to store the transmitted determined digital location.

Figure 1:
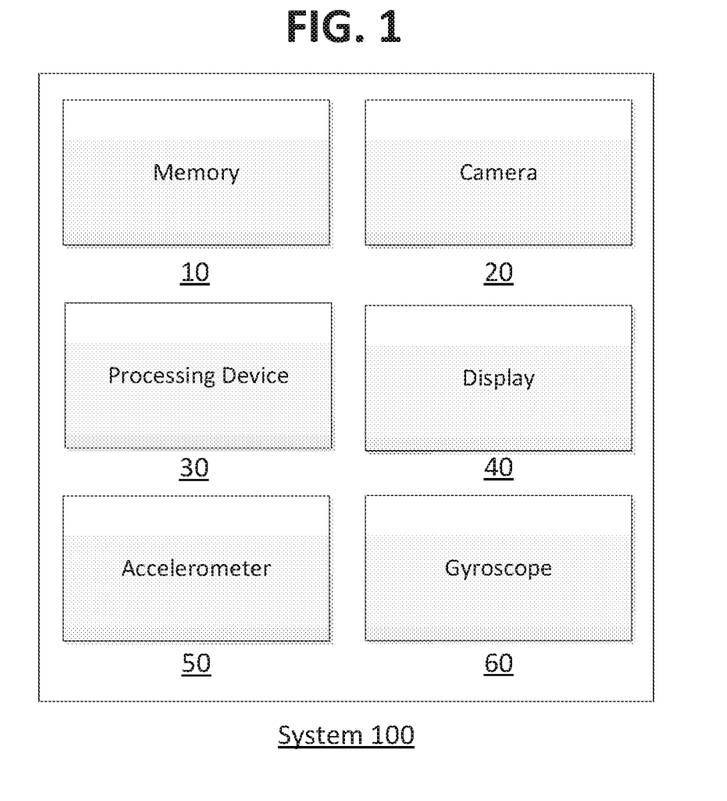
FIG. 1 illustrates an example embodiment of a system employing augmented reality.

FIG. 1 illustrates an example embodiment of a system employing augmented reality. In an embodiment, as depicted in the figure, a system 100 includes a memory 10, a camera 20, a processing device 30, a display 40, an accelerometer 50, and a gyroscope 60. In an embodiment, the system 100 may be included in a single mobile device, e.g., smart phone, tablet, personal computer, augmented reality headset, and a vehicle. In an embodiment, the memory 10 may be utilized to store computer instructions and data including all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. Further, in an embodiment, the camera 20 may be utilized to capture images of an environment surrounding the camera. In an embodiment, the images captured by the camera 20 may be a real-time live feed of the surrounding environment. Further, in an embodiment, the processing device 30 is suitable for the execution of a computer program and may include, by way of example, both general and special purpose microprocessors, and any one or more processors of any kind of digital computer. For example, the processing device 30 may receive instructions and data from the memory 10. In an embodiment, the memory 10 and the processing device 30 may be supplemented by, or incorporated in, special purpose logic circuitry. However, in another embodiment, the memory 10 and the processing device 30 may be located in separate, distinct devices. For example, the memory 10 and the processing device 30 may be implemented in a computing system that includes a back-end component, e.g., a data server, or that includes a middleware component, e.g., an application server, or that includes a front-end component, e.g., a client computer having a graphical user interface or a Web browser through which a user can interact with an implementation, or any combination of such back-end, middleware, or front-end components. Further, in an embodiment, the display 40 may be utilized to display the augmented reality experience. In an embodiment, the display 40 may be a liquid crystal display (LCD), e.g., thin-film-transistor (TFT) LCD, in-place switching (IPS) LCD, capacitive or resistive touchscreen LCD, etc. Further, the display 40 may also be an organic light emitting diode (OLED), e.g., active-matrix organic light emitting diode (AMOLED), super AMOLED, etc. In an embodiment, the accelerometer 50 may be utilized to track the movement of the mobile device including the system 100. The accelerometer 50 tracks the movement of the mobile device by measuring the proper acceleration of the mobile device, i.e., acceleration felt by the mobile device. In an embodiment, the accelerometer 50 may include at least one of piezoelectric, piezoresistive, and capacitive components to convert any mechanical motion into an electrical signal. Further, in an embodiment, the gyroscope 60 may be utilized to track an orientation of the mobile device including the system 100. The gyroscope 60 tracks the orientation of the mobile device by measuring the angular rotational velocity.

Figure 2A:
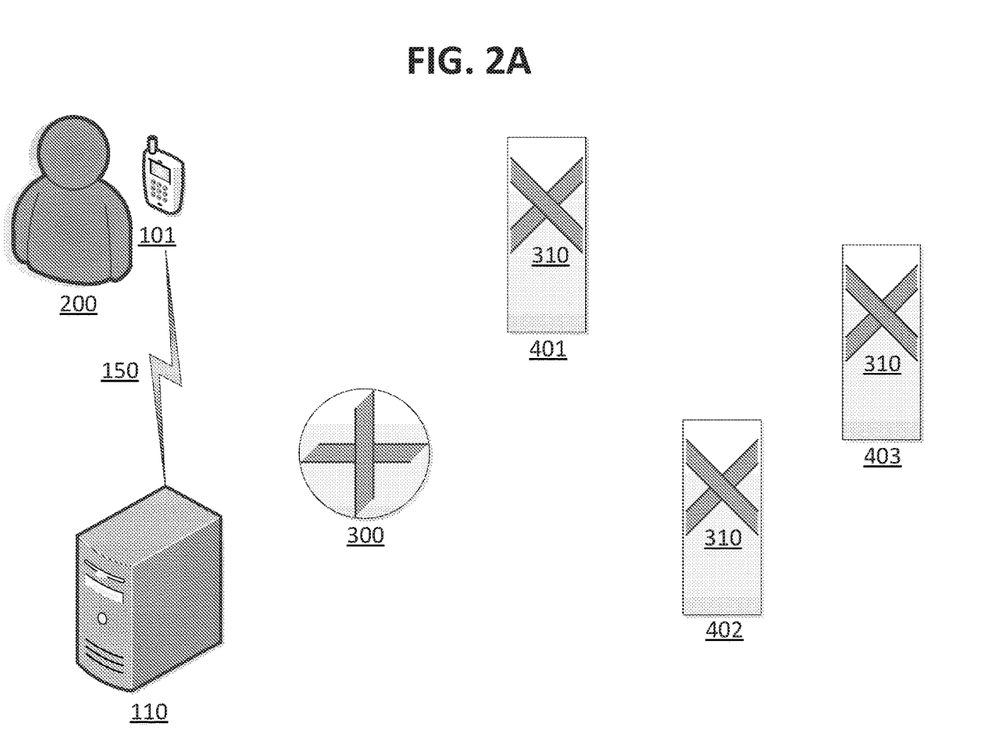
FIG. 2A illustrates an example embodiment of a mobile device interacting with a plurality of physical markers.

FIG. 2A illustrates an example embodiment of a mobile device interacting with a plurality of physical markers. In an embodiment, FIG. 2A depicts a user 200 using a mobile device 101 (e.g., smart phone) incorporating the system 100, a server 110, an origin physical marker 300, as well as a plurality of physical objects 401, 402, and 403 with corresponding physical markers 310 affixed to them. In an embodiment, the mobile device 101 may communicate with the server 110 by any form or medium of digital data communication, e.g., a communication network 150. Examples of a communication network 150 include a local area network (LAN) and a wide area network (WAN), e.g., the Internet. Further, in an embodiment, the origin physical marker 300 and the plurality of physical markers 310 can be a two-dimensional (2D) image. For example, the 2D image may be a matrix code, e.g., 2D barcode, quick response (QR) code, Vuforia tag, etc. In an embodiment, the origin physical marker 300 may be placed anywhere in a physical space associated with an augmented reality experience that can be designated as an origin point. For example, if the physical space corresponded to a car lot, the origin point may be the entrance to the car lot. As such, the origin physical marker 300 may be placed anywhere around the entrance to the car lot, e.g., door(s), welcome mat, awning, window display, etc. In an embodiment, any location in the physical space designated as the origin point (e.g., includes the origin physical marker 300) will be associated with origin coordinates (e.g., 0,0,0) in the digital space. In an embodiment, the plurality of physical markers 310 can be placed anywhere within the particular physical space associated with the augmented reality. For example, if the physical space is a car lot, the plurality of physical markers 310 can be placed at a variety of locations on the car lot floor as well as poles (e.g., physical objects 401, 402, and 403). Further, it is assumed that the plurality of physical objects 401, 402, and 403 including the corresponding physical markers 310 are static, i.e., not moving. In an embodiment, the location coordinates (e.g., x, y, z) of the plurality of physical markers 310 are determined relative to the origin physical marker 300 (e.g., 0,0,0). In an embodiment, the digital locations of the origin marker 300 and the plurality of physical markers 310 may be stored in memory 10 in the mobile device 101. However, in another embodiment, the digital locations of the origin marker 300 and the plurality of physical markers 310 may be stored in an off-site memory, e.g., the server 110. In this case, the digital locations associated with the origin marker 300 and the plurality of physical markers 310 can be provided to the mobile device 101 in response to a request for the digital locations from said mobile device. Further, in an embodiment, the physical space associated with the augmented reality experience may also be a mall, parking lot, conference hall, concert venue, park, etc. In an embodiment, the digital space, i.e., the augmented reality experience, may fit exactly into the physical space, i.e., same size, orientation, etc. In an embodiment, the physical space and all of its components may be registered into the digital space utilizing a specific augmented reality development platform (e.g., ARKit, ARCore, etc.). Further, although the above mobile device 101 was described as a mobile phone, the mobile device 101 may also be a tablet, a personal computer, an augmented reality headset, and a vehicle. Further, in an embodiment, although the plurality of physical markers 310 were described as being affixed to static objects (e.g., physical objects 401, 401, and 403), the physical markers 310 may also be affixed to or associated with moving objects (e.g., cars, carousels, etc.). With moving objects, the physical objects' positions relative to the origin position must be constantly recorded/maintained so that the calculations of the position of the observer (e.g., mobile device 101) relative to the moving physical markers 310 may remain correct. Further, in another embodiment, the physical markers 300 and 310 could be 3-D objects with known locations. For example, the 3-D object may be a landmark, statute, building, etc. In an embodiment, the processing device 30 is configured to recognize the 3-D object as a physical marker after an image of the 3-D object is captured by the camera 20. In particular, the processing device 30 may include artificial intelligence trained on images similar to the 3-D object (e.g., landmark, statute, building, etc.) in order to recognize each of the 3-D objects as physical markers.

Figure 2B:
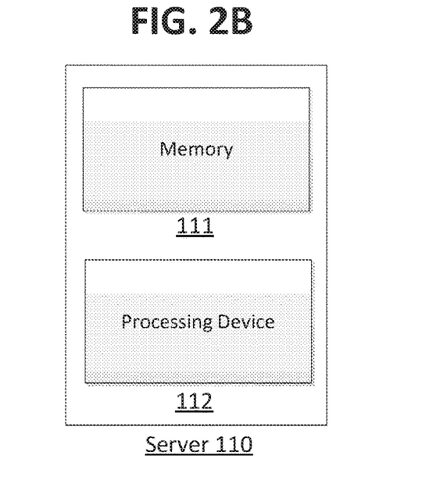
FIG. 2B illustrates an example embodiment of the server depicted in FIG. 2A.

FIG. 2B illustrates an example embodiment of the server depicted in FIG. 2A. In an embodiment, the server 110 includes a memory 111 and a processing device 112. In an embodiment, the memory 111 may be utilized to store computer instructions and data including all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. Further, in an embodiment, the processing device 112 is suitable for the execution of a computer program and may include, by way of example, both general and special purpose microprocessors, and any one or more processors of any kind of digital computer. For example, the processing device 112 may receive instructions and data from the memory 111. In an embodiment, the memory 111 and the processing device 112 may be supplemented by, or incorporated in, special purpose logic circuitry.

Figure 2C:
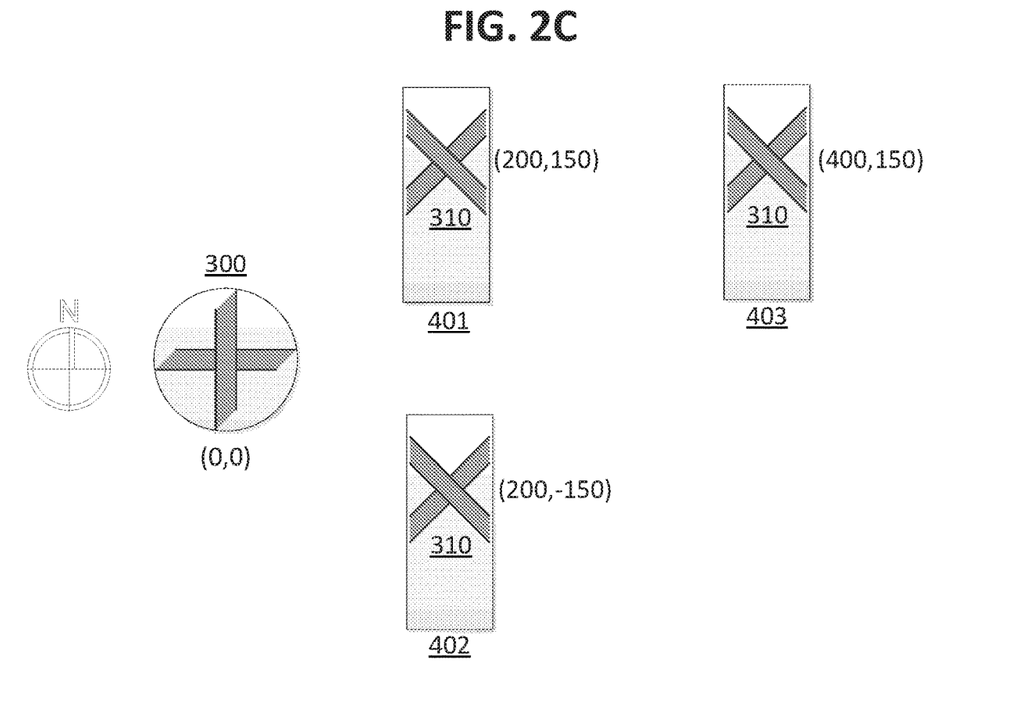
FIG. 2C illustrates an example embodiment of the physical markers depicted in FIG. 2A.

FIG. 2C illustrates an example embodiment of the physical markers depicted in FIG. 2A. In particular, FIG. 2C depicts an overhead view of the origin physical marker 300 and the plurality of physical markers 310. Specifically, the figure depicts the X-Y positions of the plurality of physical marker 310 in relation to the origin physical marker 300, i.e., (0,0). For example, the physical marker 310 associated with the object 401 has an X-Y position of (200,150), the physical marker 310 associated with the object 402 has an X-Y position of (200,−150), and the physical marker 310 associated with the object 403 has an X-Y position of (400,150). Further, as also depicted in the figure, the physical markers 310 associated with the objects 401 and 403, respectively, are located north of the origin physical marker 300 while the physical marker 310 associated with the object 402 is located south of it.

Figure 2D:
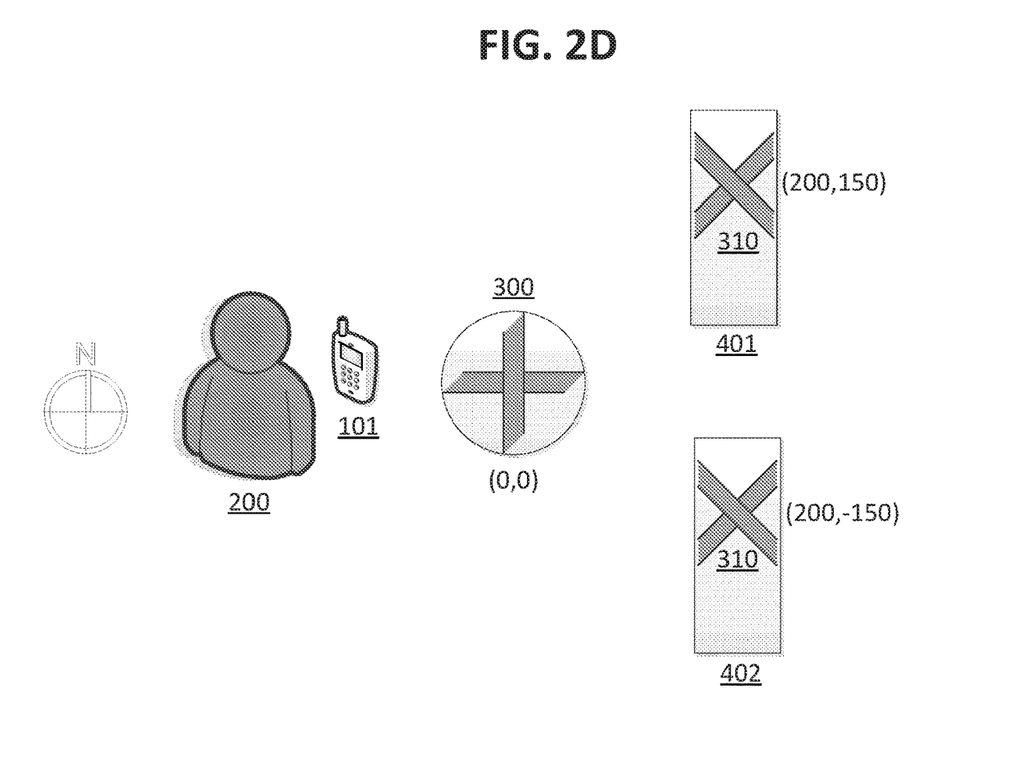
FIG. 2D illustrates an example embodiment of the mobile device in FIG. 2A interacting with a plurality of the physical markers in FIG. 2C.

FIG. 2D illustrates an example embodiment of the mobile device in FIG. 2A interacting with a plurality of the physical markers in FIG. 2C. In particular, the figure depicts the user 200 utilizing the mobile device 101 to interact with the origin physical marker 300 and the physical markers 310 associated with the physical objects 401 and 402. For example, the mobile device 101 can be utilized to register the mobile device 101 into the digital space by capturing an image of at least one of the origin physical marker 300 and the plurality of physical markers 310.

Figure 2E:
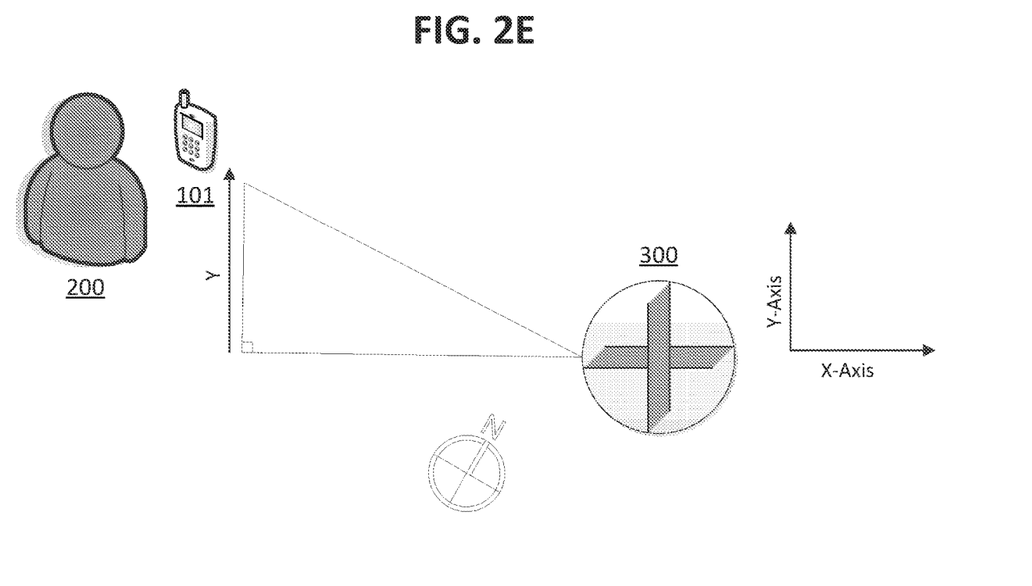
FIG. 2E illustrates an example embodiment of the mobile device interacting with the origin physical marker.

FIG. 2E illustrates an example embodiment of the mobile device interacting with the origin physical marker. In an embodiment, FIG. 2E depicts a side view of the user 200, the mobile device 101, and the origin physical marker 300. In particular, the figure depicts the Y position of the mobile device 101 in relation to the origin physical marker 300. In an embodiment, the Y position of the mobile device 101 can be determined based on the distance and angle of the mobile device 101 in relation to the origin physical marker 300. Specifically, based on the distance and angle of the mobile device 101 in relation to the origin physical marker 300, the Y position of the mobile device 101 can be determined using simple trigonometry, i.e., Y position=distance×sin(angle).

Figure 2F:
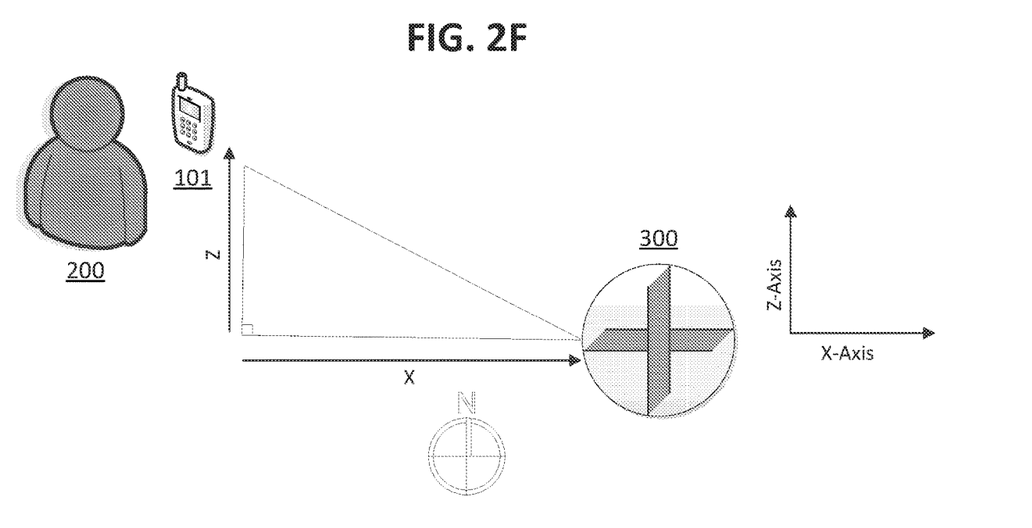
FIG. 2F illustrates another example embodiment of the mobile device interacting with the origin physical marker.

FIG. 2F illustrates another example embodiment of the mobile device interacting with the origin physical marker. In an embodiment, FIG. 2F depicts a top down view of the user 200, the mobile device 101, and the origin physical marker 300. In particular, the figure depicts the X and Z positions of the mobile device 101 in relation to the origin physical marker 300. In an embodiment, the X and Z positions of the mobile device 101 can be determined based on the distance and angle of the mobile device 101 in relation to the origin physical marker 300. Specifically, based on the distance and angle of the mobile device 101 in relation to the origin physical marker 300, the X and Z positions of the mobile device 101 can be determined using simple trigonometry, i.e., X position=distance×cos(angle), and Z position=distance×sin(angle).

Figure 2G:
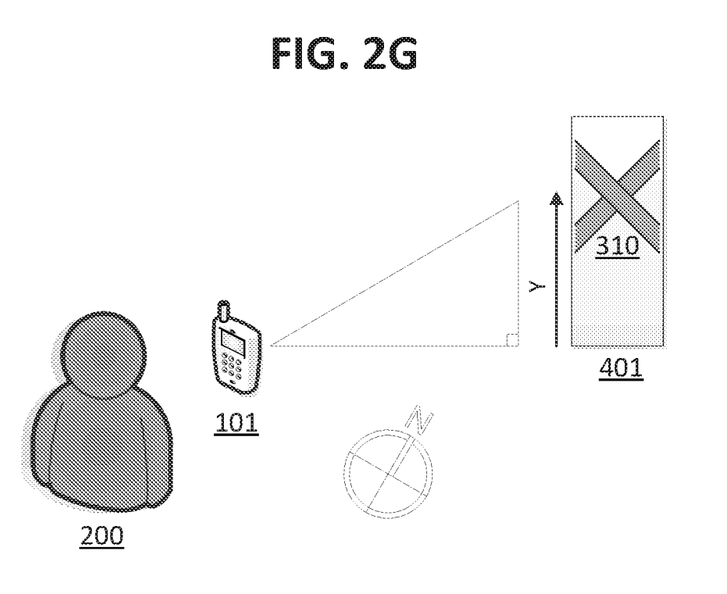
FIG. 2G illustrates an example embodiment of the mobile device interacting with one of the physical markers.

FIG. 2G illustrates an example embodiment of the mobile device interacting with one of the physical markers. In an embodiment, FIG. 2G depicts a side view of the user 200, the mobile device 101, and the physical marker 310 associated with the physical object 401. In particular, the figure depicts the Y position of the mobile device 101 in relation to that physical marker. In an embodiment, the Y position of the mobile device 101 can be determined based on the distance and angle of the mobile device 101 in relation to the physical marker 310. Specifically, similar to FIG. 2E, based on the distance and angle of the mobile device 101 in relation to the physical marker 310, the Y position of the mobile device 101 can be determined using simple trigonometry.

Figure 2H:
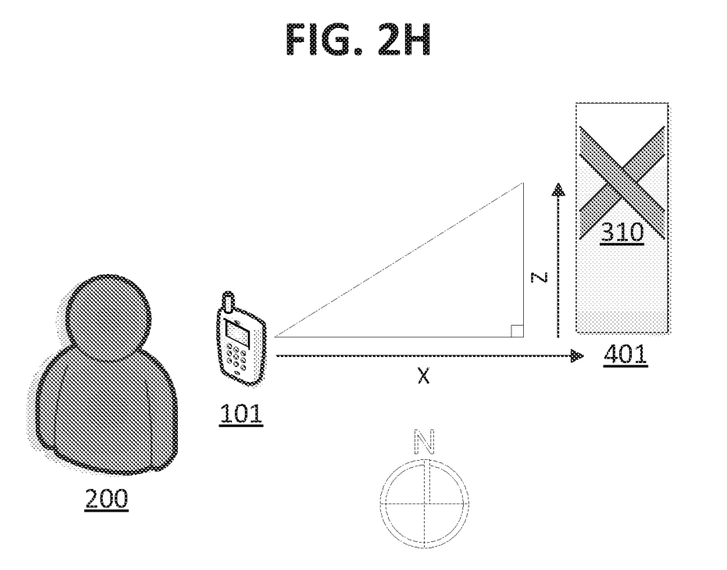
FIG. 2H illustrates another example embodiment of the mobile device interacting with one of the physical markers.

FIG. 2H illustrates another example embodiment of the mobile device interacting with one of the physical markers. In an embodiment, FIG. 2H depicts a top down view of the user 200, the mobile device 101, and the physical marker 310 associated with the physical object 401. In particular, the figure depicts the X and Z positions of the mobile device 101 in relation to that physical marker. In an embodiment, the X and Z positions of the mobile device 101 can be determined based on the distance and angle of the mobile device 101 in relation to the physical marker 310. Specifically, similar to FIG. 2F, based on the distance and angle of the mobile device 101 in relation to the physical marker 310, the X and Z positions of the mobile device 101 can be determined using simple trigonometry.

Figure 3:
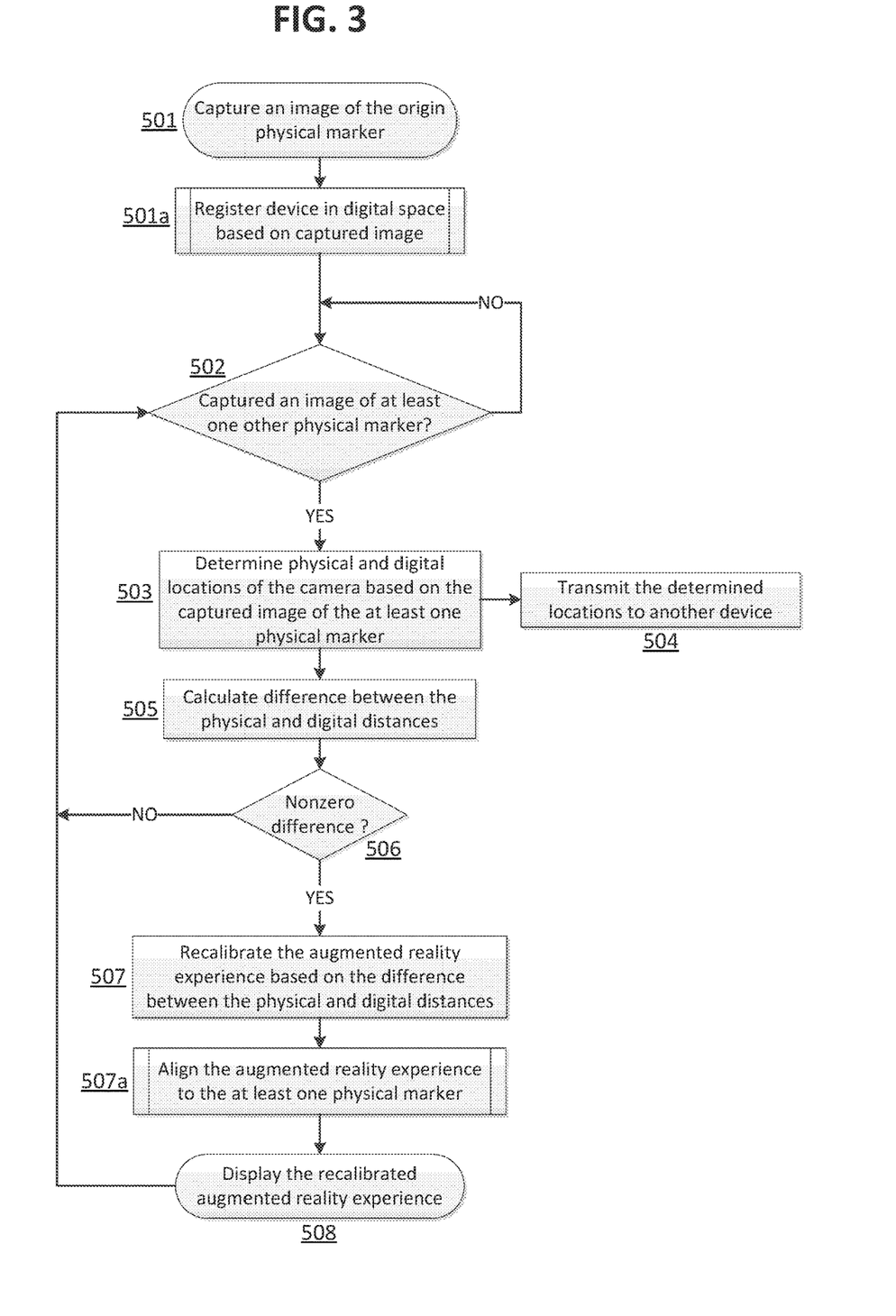
FIG. 3 illustrates an example embodiment of a method for recalibrating an augmented reality experience.

FIG. 3 illustrates an example embodiment of a method for recalibrating an augmented reality experience. As depicted in the figure, in a first step 501, the camera 20 captures an image of the origin physical marker 300. In an embodiment, the image of the origin physical marker 300 can be (i) intentionally captured by the user (e.g., by pressing a certain button) as the user approaches the origin physical marker 300 or (ii) automatically captured by the camera 20 once the origin physical marker 300 is detected in the line of sight of the camera 20. In an embodiment, once the camera 20 captures the image of the origin physical marker 300, the mobile device 101 may be registered into the digital space as depicted in step 501a. However, in another embodiment, the mobile device 101 may be registered into the digital space after capturing an image of one of the physical markers 310. In an embodiment, registering includes initializing the digital locations of the physical markers 300 and 310 with the physical locations of the physical markers 300 and 310 (which are already known to the mobile device via the memory 10 or the memory 111). As such, the digital locations of the physical markers 300 and 310 will be aligned with (e.g., match) the physical locations of the physical markers 300 and 310, thereby assuring that the digital and physical locations of the mobile device 101 will match as well. Then, after the mobile device 101 is registered into the digital space, the processing device 30 may begin generating an augmented reality experience to be displayed on the display 40. Further, assuming the digital and physical locations of the physical markers 300 and 310 remain aligned after registering the mobile device 101 into the digital space, the augmented reality experience should not drift in relation to the physical world. During this time, the user may move around the physical space while observing the augmented reality experience presented on the display 40 of the mobile device 101. In an embodiment, the orientation and movement of the mobile device 101 in the digital space may be tracked with the accelerometer 50 and the gyroscope 60. Then, in step 502, it is determined if the camera 20 captured an image of one of the physical markers 310. In an embodiment, similar to the image of the origin physical marker 300, the image of the physical markers 310 can be (i) intentionally captured by the user (e.g., by pressing a certain button) as the user approaches the physical marker 310 or (ii) automatically captured by the camera 20 once the physical marker 310 is detected in the line of sight of the camera 20. In an embodiment, if a plurality of physical markers 310 are captured, the processing device 30 can select the closest physical marker 310 to re-align to. In an embodiment, the processing device 30 can select the closest physical marker 310 by selecting the physical marker 310 that appears the largest on the display 40. Then, in step 503, after the image of the at least one physical marker 310 is captured, the processing device 30 determines the physical and digital locations of the camera 20 based on the captured image of the at least one physical marker 310. For example, the processing device 30 may determine the physical location of the camera 20 based on the distance and angle of the camera 20 in relation to the at least one physical marker 310. The distance and angle can be calculated based on the initial known size and position of the physical marker 310. If the mobile device 100 is directly in front of the physical marker 310, the marker would appear to be a certain size and shape (e.g., a square). However, as the mobile device 100 moves away from the physical marker 310, the marker appears to shrink in a function that seems to approximate a tangent. Further, as the mobile device 100 moves side to side away from the physical marker 310, the square shape starts to appear distorted, which is mathematically represented by an affine transformation. As such, the processing device 30 may apply the inverse of the affine transformation to solve for the angle and distance of the marker from the camera 20 in order to determine the physical location of the camera 20. Further, in another embodiment, the processing device 30 may determine the physical location of the camera based on a plurality of physical markers 310. For example, the processing device 30 may determine the physical location of the camera 20 based on a triangulation of the plurality of physical markers 310 in the captured image. For example, if three physical markers 310 have been identified by the processing device 30, whether on-screen simultaneously or not, then the understood distance and angle calculated for all three of these points can be used to triangulate or trilaterate the position of the mobile device 100 with respect to the three physical markers 310. As regards to the digital location, as mentioned above, the processing device 30 tracks the orientation and movement of the mobile device 101 in the digital space (e.g., with the accelerometer 50 and the gyroscope 60) and, therefore, keeps track of the mobile device 101's instantaneous position in the digital space. Accordingly, the distance and angle of the mobile device 101 in relation to the at least one physical marker 310 in the digital space may be determined by calculating the difference between the stored digital location of the at least one physical marker 310 and the instantaneous position of the mobile device 101 in the digital space. In an embodiment, the physical and digital distances may be determined simultaneously. However, in another embodiment, the physical and digital distances may be determined consecutively. For example, the physical distance is determined first and then the digital distance is determined. Similarly, the digital distance may be determined first and then the digital distance may follow. Further, in an embodiment, as depicted in step 504, the processing device 30 may then transmit the determined physical and digital locations of the camera 20 to another device, e.g., the server 110. For example, the other mobile devices may be configured to keep track of any changes to the physical and digital locations of the mobile device 101 stored at the server 110. Then, as depicted in step 505, the processing device 30 calculates the difference between the physical and digital distances. In other words, the processing device 30 determines if the augmented reality experience is drifting in relation to the physical world. For example, as depicted in step 506, if it is determined that the difference between the physical and digital distances is non-zero, then there is some drift and, therefore, corrective action is required, i.e., recalibrating the augmented reality experience as indicated by step 507. Specifically, the augmented reality experience is recalibrated based on the difference between the physical and digital distances. In particular, as depicted in step 507a, the recalibrating may include aligning the physical markers 310 in the augmented reality experience to the physical markers 310 in the physical world. Specifically, the physical markers 310 in the augmented reality experience are shifted according to the difference calculated in step 505. Lastly, in step 508, the processing device 30 may display the recalibrated augmented reality experience on the display 40. However, if the difference between the physical and digital distances is zero at step 506, then there is no drift and, therefore, no corrective action is required. In other words, the process may return to step 502. Similarly, the process may also return to step 502 after completing step 508 (i.e., displaying the recalibrated augmented reality experience on the display 40).

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

In the foregoing Description of Embodiments, various features may be grouped together in a single embodiment for purposes of streamlining the disclosure. This method of disclosure is not to be interpreted as reflecting an intention that the claims require more features than are expressly recited in each claim. Rather, as the following claims reflect, inventive aspects lie in less than all features of a single foregoing disclosed embodiment. Thus, the following claims are hereby incorporated into this Description of Embodiments, with each claim standing on its own as a separate embodiment of the invention.

Moreover, it will be apparent to those skilled in the art from consideration of the specification and practice of the present disclosure that various modifications and variations can be made to the disclosed systems without departing from the scope of the disclosure, as claimed. Thus, it is intended that the specification and examples be considered as exemplary only, with a true scope of the present disclosure being indicated by the following claims and their equivalents.

The invention claimed is:

1. A device for recalibrating an augmented reality (AR) experience the device comprising:
   a processor;
   a camera; and
   a memory, wherein the memory contains a physical marker associated with the AR experience; and
   wherein, the processor is configured to:
      capture, using the camera, an image of the physical marker,
      determine a physical location of the camera,
      determine a digital location of the camera in the AR experience,
      determine a digital distance and digital angle between the determined digital location of the camera and the digital location of the physical marker,
      calculate a difference between a physical distance and the digital distance, and
      recalibrate the AR experience based on the calculated difference, wherein the recalibration includes aligning the AR experience to the physical marker.

2. The device of claim 1, wherein the physical location of the camera is determined using the captured image of the physical marker based on a physical distance and physical angle of the camera in relation to the physical marker.

3. The device of claim 2, wherein:
   the device further comprises an accelerometer configured to track a movement of the camera, and
   at least one selected from the group of the physical distance of the camera and physical angle of the camera is updated based the movement.

4. The device of claim 3, wherein the movement is tracked in digital space.

5. The device of claim 2, wherein:
   the device further comprises a gyroscope configured to track an orientation of the camera, and
   at least one selected from the group of the physical distance of the camera and physical angle of the camera is updated based the orientation.

6. The device of claim 5, wherein the orientation is tracked in digital space.

7. The device of claim 1, wherein the device is a mobile device.

8. The device of claim 1, wherein:
   the camera is configured to capture a plurality of images, and the plurality of images comprise a real-time live feed.

9. The device of claim 1, wherein:
   the memory contains a plurality of physical markers, each of the plurality of physical markers are associated with the AR experience, and
   the processor selects the closest physical marker for alignment when aligning the AR experience.

10. The device of claim 1, wherein:
    the memory contains a plurality of physical markers and each of the plurality of physical markers are associated with the AR experience, and
    the processor selects the largest physical marker from the plurality of physical markers for alignment when aligning the AR experience.

11. A method for recalibrating an augmented reality (AR) experience using a physical marker, the method comprising:
    capturing, with a camera, an image of the physical marker;
    determining, with a processing device, a physical location of the camera based on the captured image of the physical marker;
    determining, with the processing device, a digital location of the camera in the AR experience;
    determining, with the processing device, a digital distance and digital angle between the determined digital location of the camera and the digital location of the physical markers;
    calculating, with the processing device, a difference between a physical distance and the digital distance; and
    recalibrating, with the processing device, the AR experience based on the calculated difference, wherein the recalibrating includes aligning the AR experience to the physical marker.

12. The method of claim 11, wherein aligning the AR experience to the physical marker includes determining the closest physical marker of a plurality of physical markers.

13. The method of claim 11, wherein aligning the AR experience to the physical marker includes determining the largest physical marker of a plurality of physical markers.

14. The method of claim 11, further comprising:
    establishing, with the processing device, a time period, and
    capturing, with the camera, an image of the physical marker at least once during the time period.

15. The method of claim 14, further comprising recalibrating, with the processing device, the AR experience upon each image capture by the camera.

16. The method of claim 11, further comprising:
    identifying, by the processing device, an origin physical marker;
    assigning, by the processing device, origin coordinates to the origin physical marker; and
    storing, by the processing device in a memory, the origin coordinates.

17. The method of claim 16, wherein the origin physical marker is an entrance to a physical space.

18. The method of claim 16, further comprising: determining, by the processing device, location coordinates for the physical marker, wherein the location coordinates are determined with reference to the origin coordinates.

19. An augmented reality (AR) experience recalibration application comprising instructions for execution on a device comprising a processor, a camera, and a memory storing the recalibration application, wherein, upon execution by the processor, the recalibration application is configured to:
   capture, using the camera, an image of a physical marker;
   determine a physical location of the camera;
   determine a digital location of the camera in the AR experience;
   determine a digital distance and digital angle between the determined digital location of the camera and the digital location of the physical marker;
   calculate a difference between a physical distance and the digital distance; and
   recalibrate the AR experience based on the calculated difference, wherein the recalibration includes aligning the AR experience to the physical marker.

20. The AR experience recalibration application of claim 19, wherein the recalibration application is configured to determine, using the captured image of the physical marker, the physical location of the camera based on a physical distance and physical angle of the camera in relation to the physical marker.

* * * * *